June 24, 1969  A. GRAY ET AL  3,452,210
AUTOMATIC STARTER FOR AUTOMOBILES
Filed May 23, 1966
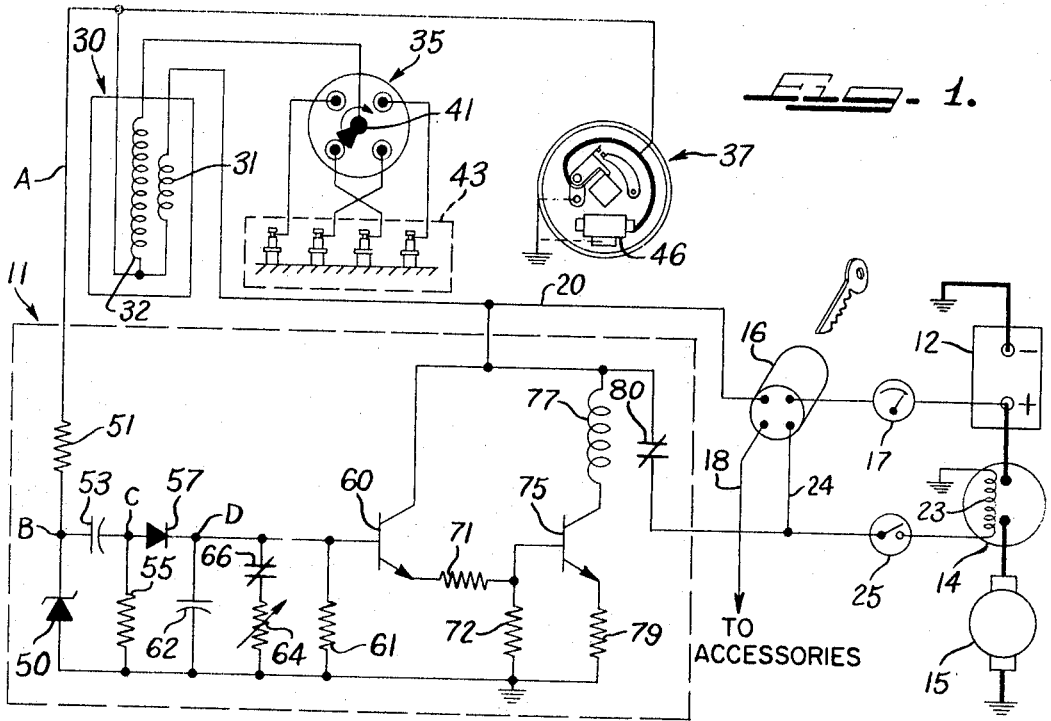
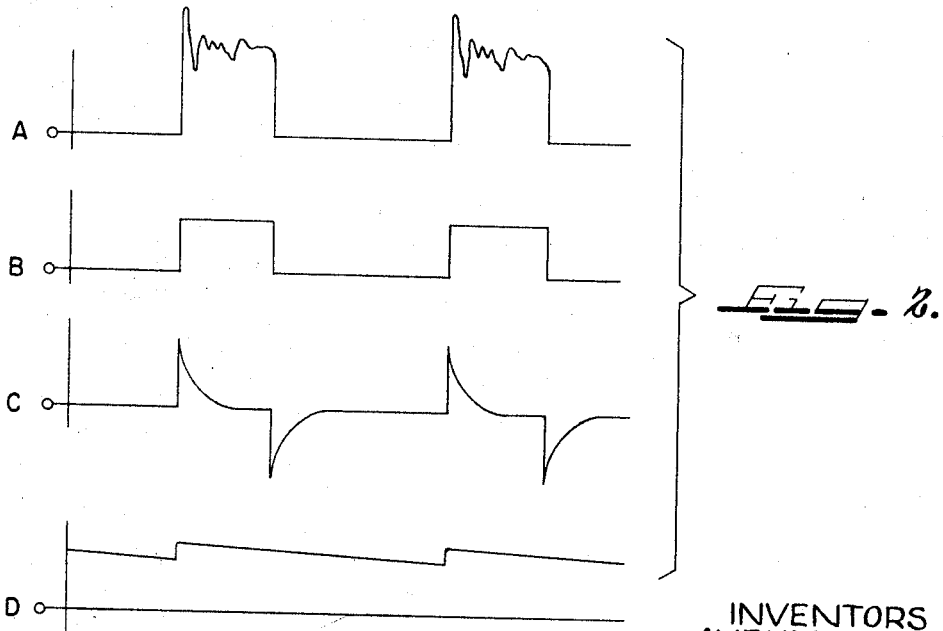
INVENTORS
AVRUM GRAY
JAMES E. STEFFENS
HARRY A. WAYNE
BY *Bair, Freeman & Molinare*
Attys.

United States Patent Office 3,452,210
Patented June 24, 1969

3,452,210
AUTOMATIC STARTER FOR AUTOMOBILES
Avrum Gray, 1077 Elm Ridge, Glencoe, Ill. 60022;
Harry A. Wayne, 4120 W. Greenwood, Skokie, Ill.
60076; and James E. Steffens, 2845 N. Melvina,
Chicago, Ill. 60634
Filed May 23, 1966, Ser. No. 552,202
Int. Cl. H02p 1/00
U.S. Cl. 290—38                                                    1 Claim

ABSTRACT OF THE DISCLOSURE

An arrangement for automatically controlling the energization of an electric motor used for starting an internal combustion engine which includes means associated with the engine for producing voltage pulses at a rate related to the rotational speed of the engine, means including a Zener diode circuit for shaping and regulating the voltage level of said voltage pulses and integrating the same to produce a control signal, and semiconductor switch means responsive to said control signal for deenergizing said electric motor when the engine reaches a first predetermined rotational speed and for reenergizing said electric motor when the engine falls below a second, and much lower, predetermined rotational speed.

---

Gasoline and diesel engines, such as those used in automotive, aeronautical and marine applications, are normally started by means of an electric motor. To start the engine, a switch is closed manually to energize the electric starting motor. When the operator determines that the engine is running, he opens the switch to deenergize the starting motor.

Because the starting motor must be quite powerful in order to develop sufficient torque to turn over the engine, it represents a significant drain on the associated battery supply. In starting a modern engine which is capable of very quiet operation, it is often difficult for the operator to discern when the engine is running properly. In consequence, the electric starting motor is normally energized for a longer period than is actually necessary. Moreover, the operator's reaction time still further lengthens the period of time during which the starting motor is needlessly energized.

It is accordingly an object of the present invention to conserve battery power by disconnecting the electric starting motor from the battery as soon as the engine has reached a rotational speed sufficient to sustain its continued operation.

Often, the engine will "fire" on one or two cylinders only, leading the operator to believe that it is properly started, and will then stall. The operator must then reenergize the starting motor to bring the engine once again up to starting speed. Moreover, because of the quiet operating capability of many automobile engines, a stalled condition after sustained operation may go unnoticed. In many situations, this unexpected stalled condition can be dangerous as well as annoying.

It is accordingly a further object of the present invention to restart an internal combustion engine by energizing the starter motor whenever engine speed falls below a predetermined value.

In a principal aspect, the present invention takes the form of an automatic control circuit for energizing an electric starting motor associated with an internal combustion engine. According to a feature of the invention, means are employed for developing a control signal having a magnitude which is directly related to the rotational speed of the engine to be started. Switching means are employed for initially connecting the starting motor to its source of electrical energy. According to a feature of the invention, means responsive to the control signal are then employed for disconnecting the starting motor after the engine reaches a first predetermined rotational speed. According to a second feature of the invention, means responsive to the control signal are employed for again energizing the starting motor whenever the rotational speed of the engine falls below a second predetermined value. The invention provides automatic starting and restarting and serves both to conserve the amount of power required by the battery source and to minimize wearing of the starting motor.

These and other objects, features and advantages of the present invention will become more apparent through a consideration of the following detailed description. In the course of this description reference will frequently be made to the attached drawings in which:

FIGURE 1 is a schematic diagram of a control circuit embodying the invention shown connected with conventional automobile starting and ignition circuits; and FIGURE 2 shows a series of waveforms which appear at various points within the circuit shown in FIGURE 1.

A control circuit embodying the invention is shown within the dashed lines indicated generally at 11 in FIGURE 1. This control circuit 11 is interconnected with an automobile ignition and starting circuit powered by a battery 12. The negative terminal of battery 12 is grounded and the positive terminal is connected through starter solenoid 14 to the input terminal of an electric starting motor 15. The other terminal of starting motor 15 is grounded. One terminal of a conventional, key-operated ignition switch 16 is connected to the positive terminal of battery 12 through an ammeter 17. When the key is inserted into switch 16 and turned counterclockwise from its normal "OFF" position, a positive voltage is applied to conductor 18 which may be employed to supply current to various accessories (lights, radio, etc.). When the switch 16 is turned clockwise from its "OFF" position, positive battery voltage is applied both to conductor 18 and to a conductor 20 which supplies operating power both to the ignition circuit and the control circuit 11. In the full clockwise or "MANUAL START" position, switch 16 applies a positive voltage to conductors 18 and 20 and also connects the positive terminal of battery 12 to the solenoid winding 23 through a circuit including conductor 24 and interlock switch 25. Interlock switch 25 is commonly included on automobiles having automatic transmissions and is closed only when the transmission operating lever (not shown) is in "neutral" or "park" in order to prevent starting when the transmission is engaged.

The ignition system shown in FIGURE 1 is conventional and includes an ignition coil indicated generally at 30 which comprises a primary winding 31 and a secondary winding 32. The distributor indicated generally at 35 and a contact breaker assembly shown generally at 37 are also conventional ignition system components. The distributor 35 includes a rotating wiper contact 41 which sequentially connects the secondary winding 32 of coil 30 to spark plugs indicated at 43. The breaker assembly is provided with a condenser shown at 46 which is connected in parallel with the contact points to prevent arcing. One side of primary winding 31 is connected to the breaker assembly 37 while its other side is connected to the supply conductor 20.

The control circuit 11 includes the series combination of the Zener diode 50 and a resistance 51 which is connected between ground and the contact points within breaker assembly 37. The series combination of a capacitor 53 and a resistor 55 is connected in parallel with the Zener diode 50. The anode of a diode 57 is connected to the junction of capacitor 53 and resistor 55 while its cathode is connected to the base of a transistor 60. A resistor 61 and a capacitor 62 are each connected between the base of transistor 60 and ground. A variable resistor 64 and a set of normally closed relay contacts 66 are connected in series between the base of transistor 60 and ground.

Transistor 60 is connected in an emitter-follower configuration with its collector connected to the supply conductor 20 and its emitter connected to ground by the series combination of resistors 71 and 72. The transistor 60 drives a second transistor 75 whose base is connected to the junction of resistors 71 and 72. The collector of transistor 75 is connected through a relay solenoid winding 77 to the supply conductor 20 and the emitter of transistor 75 is connected to ground through a resistor 79. The control circuit 11 also includes a second set of relay contacts 80 which are connected between the supply conductor 20 and conductor 24.

Before the engine builds up to speed, and after the ignition switch 16 is turned to its first clockwise position to energize conductor 20, current flows from conductor 20 through the normally closed relay contacts 80 and the interlock switch 25 to energize the starter solenoid 24.

The control circuit 11 operates in response to the increase in engine speed to deenergize starting motor 15. Control circuit 11 measures engine speed by sensing the voltage pulses appearing across the contact points in breaker assembly 37. This complex pulse waveform is shown in line A of FIGURE 2. When the contact points in breaker 37 open, a positive pulse is applied by way of resistor 51 to the Zener diode 50 which begins to conduct as soon as the voltage at point B exceeds a predetermined value. Zener diode 50 therefore has the effect of regulating the maximum voltage level at point B, thus eliminating the high frequency components which are superimposed upon the positive going pulses shown in line A of FIGURE 2. As seen in line B of FIGURE 2, the waveform at point B in FIGURE 1 is a sequence of substantially rectangular voltage pulses.

The series combination of capacitor 53 and resistor 55 acts as a differentiating circuit to produce positive going pulses at point C whenever the leading edge of a rectangular pulse exists at point B and further to produce negative going pulses at point C at the trailing edges of the pulses appearing at point B. The diode 57 allows only the positive-going pulses to be applied to the integrating capacitor 62.

Between positive-going pulses which appear at point C, a small amount of charge leaks off integrating capacitor 62 by way of resistor 61 and variable resistor 64. In consequence, the voltage at point D has the "sawtooth" shape as shown in line D of FIGURE 2. The average voltage appearing across capacitor 62 is accordingly determined by the rate at which pulses are produced by the opening of the contact points in breaker assembly 37; that is, the voltage applied to the base of transistor 60 is directly related to the rotational speed of the engine. When engine speed reaches a predetermined value (e.g., 200–300 r.p.m.), the voltage at the base of transistor 60 becomes sufficiently positive to allow collector-emitter current to flow through the transistor 60 and to create a positive voltage at the base of transistor 75, turning transistor 75 ON as well. With transistor 75 in a conducting state, the current flowing through solenoid winding 77 operates to open both relay contacts 80, deenergizing the starting motor 15.

As soon as the control circuit 11 is actuated by a sufficiently high engine speed, the current through solenoid 77 also opens relay contacts 66. With relay contacts 66 open, the integrating capacitor 62 is allowed to lose charge only through the circuit path provided by resistor 61. (The emitter-follower connection for transistor 60 creates a very high input impedance at the base of transistor 60 such that only nominal base current flows therethrough). In consequence, a much lower pulse rate from distributor 37 is sufficient to keep the transistors 60 and 75 in an ON condition.

If, however, the engine should stall for some reason such that engine speed falls below a relatively low value (e.g., 50 r.p.m.), the voltage at point D falls to a value sufficiently low to turn transistor 60 and 75 OFF. At this time, relay contacts 80 return to their normally closed position to again activate the starting motor 15.

As described above, the starting circuit 11 automatically disconnects the starting motor 15 as soon as the engine reaches a predetermined rotational speed and automatically reenergizes the starting motor 15 whenever engine speed falls below a second, lower value. The threshold level of engine speed necessary to cause the starting motor 15 to be deenergized may be selected by varying the resistance of variable resistor 64. The selected threshold engine speed should preferably lie between the maximum speed at which the starter, by itself, is able to rotate the engine and minimum expected engine idling speed. By appropriately setting resistor 64, the control circuit 11 can function to disconnect the starter 15 as soon as the engine begins to run smoothly.

Those skilled in the art will appreciate that modifications and alternative embodiments of the invention illustrated in FIGURE 1 may be made by following the principles of the present invention as disclosed herein. For example, as an alternative to connecting the conductor 20 directly to the ignition switch 16, the conductor 20 may be connected through normally open relay contacts which are returned to a positive terminal of the battery 12. These normally open contacts would be operatively associated with a relay solenoid winding connected between ground and one side of an ignition coil primary such that when the ignition circuit is energized the solenoid winding also becomes energized to close its contacts and apply battery power to conductor 20. Such an alternative embodiment would facilitate connection of the invention to an automobile ignition and starting circuit.

It is to be understood that the embodiment of the invention which has been described is merely illustrative of one application of the principles of the invention. Numerous modifications may be made by those skilled in the art without departing from the true spirit and scope of the invention.

What is claimed is:

1. An arrangement for controlling the energization of an electric motor adapted to start an internal combustion engine, comprising in combination:

means for initially energizing said electric motor for operating the same to rotate the engine, means for developing a control signal having a magnitude directly related to the rotational speed of the engine, including means operatively associated with said engine for producing voltage pulses at a rate representative of the rotational speed of the engine, means for applying said voltage pulses to a Zener diode circuit for regulating the voltage level of said pulses and for eliminating undesirable high frequency components therefrom, means for applying the said pulses from the zener diode circuit to a pulse shaping and integrating circuit to produce a control voltage directly related to the rotational speed of the engine, said integrating circuit including a capacitor which is charged each time a voltage pulse is produced to provide said control signal and means responsive to said control signal for de-energizing said electric motor when the engine reaches a first predetermined rotational speed and for reenergizing said electric motor when the engine falls below a second and much lower, predetermined rotational speed, the latter means comprising a semiconductor switch connected to be turned on or off for operating a motor control relay in response to the control signal at said integrating circuit.

References Cited

UNITED STATES PATENTS

| | | | | |
|---|---|---|---|---|
| 1,941,433 | 12/1933 | Doman. | | |
| 2,035,820 | 3/1936 | Maurer | 290—38 X |
| 2,131,403 | 9/1938 | Loehr et al. | | |
| 3,053,243 | 9/1962 | Domaun | 123—179 |
| 3,180,997 | 4/1965 | Short et al. | 290—38 |
| 3,220,396 | 11/1965 | Heidner et al. | 123—148 |
| 3,264,484 | 8/1966 | Keuchen | 290—38 |

ORIS L. RADER, *Primary Examiner.*

LESTER L. HEWITT, *Assistant Examiner.*